US012526885B2

United States Patent
Wu et al.

(10) Patent No.: US 12,526,885 B2
(45) Date of Patent: Jan. 13, 2026

(54) DIMMING CIRCUIT AND LAMP WITH NIGHT LIGHT FUNCTION

(71) Applicant: Xiamen Topstar Lighting Co., Ltd., Xiamen (CN)

(72) Inventors: Yongjie Wu, Xiamen (CN); Wenda Wen, Xiamen (CN); Jinyun Lin, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 44 days.

(21) Appl. No.: 18/765,716

(22) Filed: Jul. 8, 2024

(65) Prior Publication Data

US 2024/0365446 A1 Oct. 31, 2024

(30) Foreign Application Priority Data

Jul. 1, 2024 (CN) .......................... 202421535550.9

(51) Int. Cl.
*H05B 45/10* (2020.01)
(52) U.S. Cl.
CPC ................... *H05B 45/10* (2020.01)

(58) Field of Classification Search
CPC ............................... H05B 45/10; Y02B 20/40
See application file for complete search history.

(56) References Cited

U.S. PATENT DOCUMENTS

| 2010/0201278 A1* | 8/2010 | Zhao | H05B 45/46 315/297 |
| 2018/0352622 A1* | 12/2018 | Ng | H05B 45/46 |
| 2023/0363064 A1* | 11/2023 | Jiang | H05B 45/37 |

* cited by examiner

*Primary Examiner* — Minh Tran
(74) *Attorney, Agent, or Firm* — Westbridge IP LLC

(57) ABSTRACT

Disclosed is a dimming circuit with a night light function, having a rectifier module, an LED light source, a selection module and a dimming control module. An input end of the rectifier module is connected to a power supply; an output end of the rectifier module is respectively connected to an anode of the LED light source, a control input end of the selection module and a dimming signal input end of the dimming control module; the selection module has a first pathway and a second pathway which can be gated and output different current values; an output end of the dimming control module is connected to an input end of the first pathway and an input end of the second pathway respectively; and the cathode of the LED light source is connected to an output end of the first pathway and an output end of the second pathway.

19 Claims, 2 Drawing Sheets

DIMMING CIRCUIT AND LAMP WITH NIGHT LIGHT FUNCTION

CROSS-REFERENCE TO RELATED APPLICATIONS

This application claims priority to Chinese Patent Application No. 202421535550.9, filed on Jul. 1, 2024, the content of which is incorporated herein by reference in its entirety.

TECHNICAL FIELD

The present disclosure relates to the technical field of light-emitting diode (LED) circuits, and more particularly to a dimming circuit and a lamp with a night light function.

BACKGROUND

The existing LED circuit, to achieve a main lighting function and a small night light function, usually sets up one path of light source for achieving the main lighting function and the other path of light source for achieving the night light function, and the two paths of light sources are switched to achieve the main lighting function and the small night light function.

SUMMARY

The technical problem to be solved by the present disclosure is: to provide a dimming circuit and a lamp with a night light function, achieving a night light function and a main lighting function through one light source, thereby reducing costs.

In order to solve the above technical problem, the technical solution adopted by the present disclosure is:
 a dimming circuit with a night light function, including a rectifier module, an LED light source, a selection module and a dimming control module; an input end of the rectifier module being used to connect to a power supply; an output end of the rectifier module respectively being connected to an anode of the LED light source, a control input end of the selection module and a dimming signal input end of the dimming control module; the selection module, including a first pathway and a second pathway which can be gated and output different current values; an input end of the first pathway and an input end of the second pathway both being connected to an output end of the dimming control module; and an output end of the first pathway and an output end of the second pathway both being connected to a cathode of the LED light source.

The beneficial effects of the present disclosure are: a first output end and a second output end of a selection module output different current values and an LED light source is in gated connection with a first pathway or a second pathway of the selection module, that is, the luminance of the LED light source is controlled based on different current values output by the first output end or the second output end. By doing so, the night light function and the main lighting function are achieved through only one path of light source, that is, when the night light status is increased, the main lighting status is not affected, thereby reducing the cost; and at the same time, a dimming control module is further provided to achieve luminance control under the main lighting state, meeting the lighting requirements for different luminance.

DETAILED DESCRIPTION OF THE EMBODIMENTS

In order to explain the technical contents, achieved objectives and effects of the present disclosure in detail, the following description will be made in conjunction with the embodiments and accompanying drawings.

Figure 1:
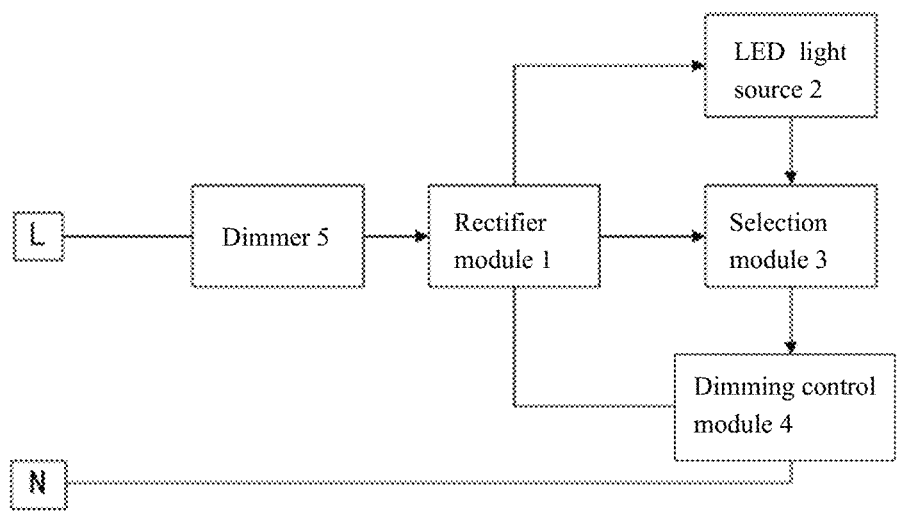
FIG. 1 is a module schematic diagram of a dimming circuit with a night light function according to one or more embodiments.

Refer to FIG. 1, a dimming circuit with a night light function is provided, including a rectifier module, an LED light source, a selection module and a dimming control module; wherein an input end of the rectifier module is used to connect to a power supply; an output end of the rectifier module is respectively connected to an anode of the LED light source, a control input end of the selection module and a dimming signal input end of the dimming control module; the selection module includes a first pathway and a second pathway which can be gated and output different current values; an output end of the dimming control module is connected to an input end of the first pathway and an input end of the second pathway respectively; and a cathode of the LED light source is connected to an output end of the first pathway and an output end of the second pathway.

From the above description, the beneficial effects of the present disclosure are: a first output end and a second output end of a selection module output different current values and an LED light source is in gated connection with a first pathway or a second pathway of the selection module, that is, the luminance of the LED light source is controlled based on different current values output by the first output end or the second output end. By doing so, the night light function and the main lighting function are achieved through only one path of light source, that is, when the night light status is increased, the main lighting status is not affected, thereby reducing the cost; and at the same time, a dimming control module is further provided to achieve luminance control under the main lighting state, meeting the lighting requirements for different luminance.

Further, the selection module includes a switch chip, a first resistor and a second resistor; a resistance value of the first resistor is different from a resistance value of the second resistor; an output end of the dimming control module is respectively connected to one end of the first resistor and one end of the second resistor; the switch chip internally includes the first pathway and the second pathway; the other end of the first resistor is connected to the input end of the first pathway; the other end of the second resistor is connected to the input end of the second pathway; an output end of the first pathway and an output end of the second pathway are connected to a cathode of the LED light source; and a control input end of the switch chip is connected to an output end of the rectifier module, and voltage change of the output end of the rectifier module is detected to gate the first pathway or the second pathway.

It can be seen from the above description that a switch chip, a first resistor and a second resistor form a selection module, and a first resistor and a second resistor with different resistance values are respectively connected to a first pathway and a second pathway of a selection module.

In this way, a first pathway and a second pathway form different current values, so that the night light function and the main lighting function are respectively achieved through a first pathway and a second pathway.

Further, a resistance range of the first resistor is 0-10Ω.

It can be seen from the above description that by setting a resistance range of a first resistor to 0-10Ω, a first pathway generates a larger current, thereby achieving the main lighting function.

Further, a resistance range of the second resistor is 10-100Ω.

It can be seen from the above description that by setting a resistance range of a second resistor to 10-100Ω, a second pathway generates a current that is much smaller than a first pathway, thereby achieving the night light function.

Further, the selection module further includes a third resistor, a first capacitor and a second capacitor; a first power supply end of the switch chip is respectively connected to one end of the third resistor and one end of the first capacitor; a second power supply end of the switch chip is connected to one end of the third capacitor; and an output end of the dimming control module is connected to the other end of the third resistor, the other end of the first capacitor and the other end of the third capacitor respectively.

It can be seen from the above description that a first capacitor and a second capacitor are arranged, so that a switch chip achieves the setting of the minimum switching time and the reset time by detecting the power-down condition of a first capacitor and a second capacitor; and a first capacitor is arranged to discharge for a second capacitor, reducing the minimum switching time.

Further, a resistance value of the third resistor is 15 KΩ; the capacity value of the first capacitor is 4.7 uF; and the capacity value of the second capacitor is 4.7 uF.

Further, a ninth resistor is also included; one end of the ninth resistor is connected to an output end of the rectifier module; and the other end of the ninth resistor is connected to a control input end of the selection module.

Further, a resistance value of the ninth resistor is 51 KΩ.

Further, the rectifier module includes an insurance resistor, a varistor and a rectifier bridge; one end of the insurance resistor is used to connect to a live wire of a power supply; the other end of the insurance resistor is connected to one end of the varistor and a first input end of the rectifier bridge respectively; the other end of the varistor and a second input end of the rectifier bridge are used to connect to a neutral wire of a power supply; and an output end of the rectifier bridge is respectively connected to an anode of the LED light source, a control input end of the selection module and a dimming signal input end of the dimming control module.

Further, a specification of the insurance resistor is 10Ω-1 W; a specification of the varistor is 241 V.

It can be seen from the above description that input mains supply is converted into direct current by arranging a rectifier bridge, and surge protection is provided for the circuit by arranging an insurance resistor and a varistor.

Further, a dimmer is also included; an output end of the dimmer is connected to an input end of the rectifier module; and an input end of the dimmer is used to connect to a power supply.

It can be seen from the above description that by arranging a dimmer, the LED luminance can be adjusted based on the dimmer.

Further, the dimming control module includes a silicon controlled rectifier constant current control chip; a dimming signal input end of the silicon controlled rectifier constant current control chip is connected to an output end of the rectifier module; and an output end of the silicon controlled rectifier constant current control chip is connected to a power supply end of the selection module.

It can be seen from the above description that employing a silicon controlled rectifier constant current control chip as a dimming control module allows a dimming control module to turn on discharge current according to the access condition of a dimmer, improving the compatibility of the entire lamp dimming, and thereby achieving compatible silicon controlled rectifier dimming in both main lighting and night light modes.

Further, the dimming control module also includes a fourth resistor, a fifth resistor and a sixth resistor; one end of the fourth resistor is connected to a current discharge end of the silicon controlled rectifier constant current control chip; the other end of the fourth resistor is respectively connected to one end of the fifth resistor, one end of the sixth resistor and an output current control end of the silicon controlled rectifier constant current control chip; and, the other end of the fifth resistor and the other end of the sixth resistor are connected to ground.

Further, a resistance range of the fourth resistor is 0-10Ω; a resistance range of the fifth resistor is 0-10Ω; and a resistance range of the sixth resistor is 0-10Ω.

It can be seen from the above description that a fourth resistor is used to set the magnitude of discharge current, thus changing discharge current and improving the dimming compatibility of the entire lamp; a fifth resistor and a sixth resistor are used to adjust the output current of a silicon controlled rectifier constant current control chip.

Further, the dimming control module also includes a seventh resistor; one end of the seventh resistor is connected to the output end of the silicon controlled rectifier constant current control chip; and the other end of the seventh resistor is connected to a voltage control end of the silicon controlled rectifier constant current control chip.

It can be seen from the above description that a seventh resistor acts as a linear adjustment rate resistor, adjusting the voltage of a silicon controlled rectifier constant current control chip to modulate output current, so that input voltage stabilizes within a preset voltage range and reduces power changes.

Further, a resistance value of the seventh resistor is 150 KΩ.

Further, a tenth resistor is also included; one end of the tenth resistor is connected to an output end of the rectifier module; and the other end of the tenth resistor is connected to a dimming signal input end of the silicon controlled rectifier constant current control chip.

Further, a diode is included; an anode of the diode is connected to an output end of the rectifier module; and a cathode of the diode is connected to an anode of the LED light source respectively.

Further, an electrolytic capacitor and an eighth resistor are also included; an anode of the electrolytic capacitor is connected to one end of the eighth resistor and a cathode of the diode respectively; and a cathode of the electrolytic capacitor is connected to the other end of the eighth resistor and the output end of the dimming control module respectively.

The present disclosure also provides a dimming lamp with a night light function, including the above-mentioned dimming circuit with a night light function.

The dimming circuit and lamps with night light function provided by the present disclosure are applied in home lighting scenarios, and only use one path of light source to achieve the night light function and the main lighting function. The specific implementations are described below:

in some embodiments, please refer to FIG. 1, a dimming circuit with a night light function includes a rectifier module 1, an LED light source 2, a selection module 3 and a dimming control module 4; an input end of the rectifier module 1 is used to connect to a power supply; an output end of the rectifier module 1 is connected to an anode of the LED light source 2, a control input end of the selection module 3, and a dimming signal input end of the dimming control module 4 respectively; The selection module 3 includes a first pathway and a second pathway, which can be gated and output different current values; an output end of the dimming control module 4 is connected to an input end of the first pathway and an input end of the second pathway respectively; a cathode of the LED light source 2 is connected to an output end of the first pathway and an output end of the second pathway; and wherein, an input end of the rectifier module 1 is provided with a dimmer 5, and an input end of the dimmer 5 is used to connect to a live wire of a power supply.

Figure 2:
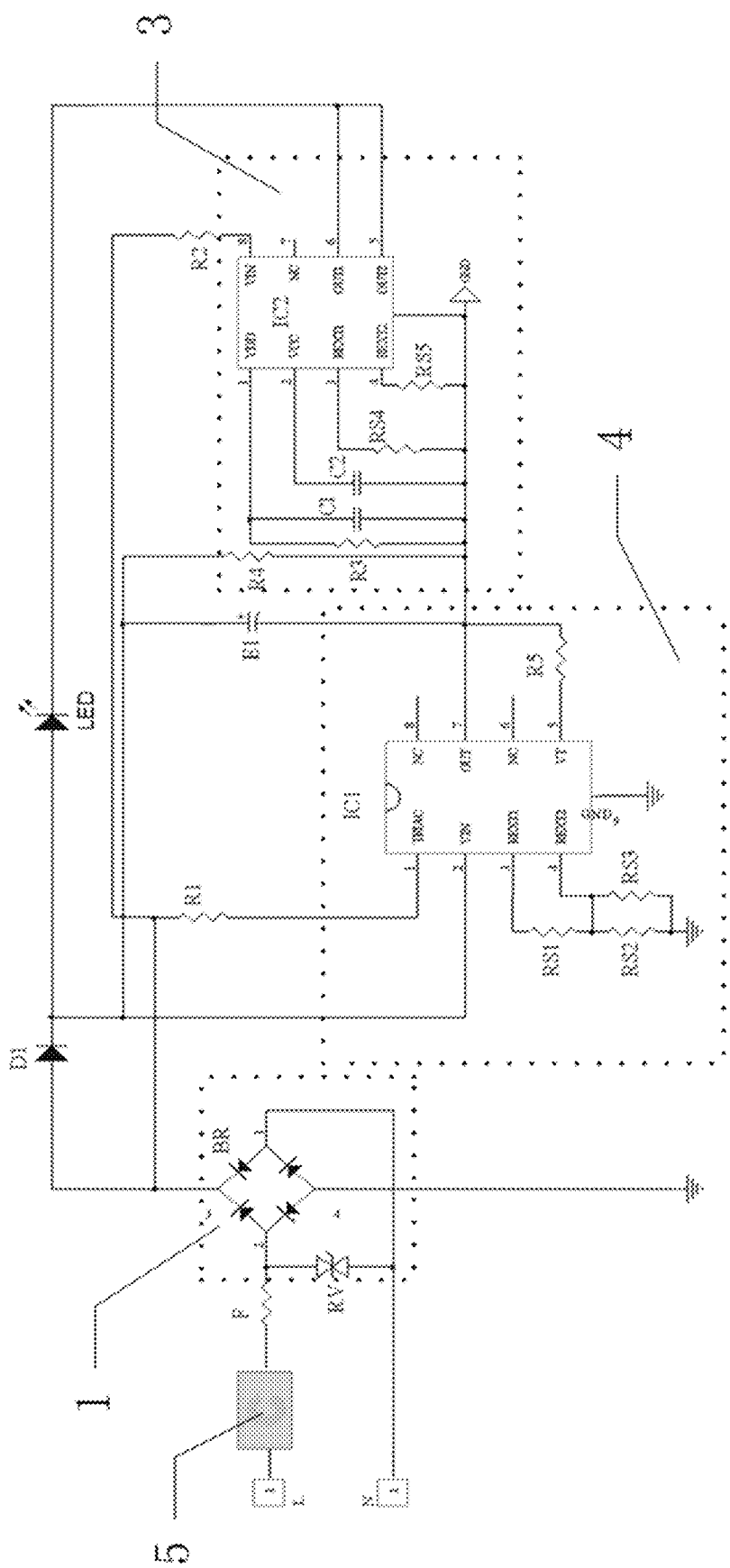
FIG. 2 is a schematic circuit connection diagram of a dimming circuit with a night light function according to one or more embodiments.

Refer to FIG. 2, a selection module 3 includes a switch chip IC2, a first resistor RS4, a second resistor RS5, a third resistor R3, a first capacitor C1 and a second capacitor C2; wherein, a resistance range of the first resistor RS4 in this embodiment is 0-10Ω, for example, the value is 0 Ω, 5Ω or 10Ω and the like, and a resistance range of the second resistor RS5 is 10-100Ω, for example, the value is 10 Ω, 50Ω or 100Ω and the like, and a resistance value of the first resistor RS4 is different from a resistance value of the second resistor RS5; by adjusting the resistance values of the first resistor RS4 and the second resistor RS5, current magnitude of the first pathway and the second pathway are controlled; a capacitance value of the first capacitor C1 is 4.7 uF, a capacitance value of the second capacitor C2 is 4.7 uF, and a resistance value of the third resistor R3 is 15 KΩ; the model of the switch chip IC2 is SM2212; wherein, a ninth resistor R2 with a resistance value of 51 KΩ and a resistor R4 (with a resistance value of 200 KΩ are further included, and resistance values of resistors and capacitance values of capacitors in the module are adjusted according to the actual situation to obtain appropriate resistance and capacitance values, the specific connection method of the module is as follows:

an output end of the dimming control module 4 is connected to one end of the first resistor RS4 and one end of the second resistor RS5 respectively; the switch chip IC2 internally includes a first pathway and a second pathway; the other end of the first resistor RS4 is connected to an input end (REXT1) of the first pathway; the other end of the second resistor RS5 is connected to an input end (REXT2) of the second pathway; an output end (OUT1) of the first pathway and an output end (OUT2) of the second pathway is connected to a cathode of the LED light source 2; an control input end (VIN) of the switch chip IC2 is connected to an output end of the rectifier module 1, and detects the voltage change at the output end of the rectifier module 1 to gate the first pathway or the second pathway; that is, by detecting the pulse of the wall switch, the output end of the first pathway (OUT1) and the output end of the second pathway (OUT2) are thus turned on in turn; the first power supply end (VDD) of the switch chip IC2 is connected to one end of the third resistor R3 and one end of the first capacitor C1 respectively; the second power supply end (VCC) of the switch chip IC2 is connected to one end of the third capacitor; and an output end of the dimming control module 4 is connected to the other end of the third resistor R3, the other end of the first capacitor C1 and the other end of the third capacitor respectively.

The rectifier module 1 includes an insurance resistor F, a varistor RV and a rectifier bridge BR; one end of the insurance resistor F is used to connect to an output end of the dimmer 5; the other end of the insurance resistor F is connected to one end of the varistor RV and a first input end (pin 2) of the rectifier bridge BR; the other end of the varistor RV and s second input end (pin 1) of the rectifier bridge BR are used to connect to a neutral wire of a power supply; an output end (pin 3) of the rectifier bridge BR is connected to an anode of the LED light source 2, a control input end of the selection module 3, and a dimming signal input end of the dimming control module 4 respectively; wherein, a diode D1 is also arranged between the LED light source 2 and the rectifier bridge BR, that is, an anode of the diode D1 is connected to an output end of the rectifier module 1; and a cathode of the diode D1 is connected to an anode of the LED light source 2 respectively, a specification of the diode D1 is 1 A-600 V, a specification of the insurance resistor F is 10 Ω-1 W, and a specification of the varistor RV is 241 V.

The dimming control module 4 includes a silicon controlled rectifier constant current control chip IC1, a fourth resistor RS1, a fifth resistor RS2, a sixth resistor RS3, and a seventh resistor R5; wherein, the model of the silicon controlled rectifier constant current control chip IC1 in this embodiment is SM2196; a resistance range of the fourth resistor RS1, the fifth resistor RS2 and the sixth resistor RS3 is 0-10Ω, for example, a resistance value is 0 Ω, 5Ω or 10Ω and the like; a resistance value of the seventh resistor R5 is 150 KΩ and resistance values of resistors and capacitance values of capacitors in the module are adjusted according to the actual situation, and the specific connection method of the module is as follows:

a dimming signal input end (TRIAC) of the silicon controlled rectifier constant current control chip IC1 is connected to an output end (pin 3) of the rectifier module 1, and an output end (OUT) of the silicon controlled rectifier constant current control chip IC1 is connected to a power supply end of the selection module 3; wherein, a tenth resistor R1 is further included; one end of the tenth resistor R1 is connected to an output end of the rectifier module 1; the other end of the tenth resistor R1 is connected to a dimming signal input end of the silicon controlled rectifier constant current control chip IC1, that is, the tenth resistor R1 is arranged between the dimming signal input end (TRIAC) of the silicon controlled rectifier constant current control chip IC1 and the output end (pin 3) of the rectifier module 1, and a resistance value of the tenth resistor R1 is 200Ω; one end of the fourth resistor RS1 is connected to a current discharge end (REXT1) of the silicon controlled rectifier constant current control chip IC1; the other end of the fourth resistor RS1 is connected to one end of the fifth resistor RS2, one end of the sixth resistor RS3 and an output current control end (REXT2) of the silicon controlled rectifier constant current control chip IC1 respectively; the other end of the fifth resistor RS2 and the other end of the sixth resistor RS3 are connected to ground; one end of the seventh resistor R5 is connected to an output end (OUT) of the silicon controlled rectifier constant current control chip IC1; the other end of the seventh resistor R5 is connected to a voltage control end (VT)

of the silicon controlled rectifier constant current control chip IC1; an electrolytic capacitor E1 is arranged between the power supply (VIN) of the silicon controlled rectifier constant current control chip IC1 and the ground, and at the same time, an eighth resistor R4 is connected in parallel to both ends of the electrolytic capacitor E1, that is, an anode of the electrolytic capacitor E1 is connected to one end of the eighth resistor R4 and a cathode of the diode D1 respectively; and a cathode of the electrolytic capacitor E1 is connected to the other end of the eighth resistor R1 and an output end of the dimming control module 4 respectively to ensure that the LED light source 2 can operate stably.

The above-mentioned dimming circuit with a night light function works as follows:

when a closing signal of the wall switch is detected, the circuit is energized and operates normally, and the switch chip IC2 controls the first pathway to be turned on so that the LED light source 2 is in the main lighting mode; and at the same time, in the main lighting mode, luminance of the LED light source 2 is controlled through the dimmer 5.

When the disconnection signal of the wall switch is detected, and the wall switch is re-powered on within a preset time after the power is off, for example, the switch is powered on again within 3 seconds after the power is off, the switch chip IC2 detects the pulse signal of the wall switch, and the second pathway is controlled to be turned on so that the LED light source 2 is in the night light mode.

In some embodiments, the present disclosure also provides a dimming lamp with a night light function, including the above-mentioned dimming circuit with a night light function.

The above are only embodiment of the present disclosure, and are not intended to limit the patent scope of the present disclosure. Any equivalent transformations made using the contents of the description and drawings of the present disclosure, or directly or indirectly applied in related technical fields, are similarly included in within the patent protection scope of the present disclosure.

What is claimed is:

1. A dimming circuit with a night light function, comprising a rectifier module, a light-emitting diode (LED) light source, a selection module and a dimming control module; wherein an input end of the rectifier module used to connect to a power supply;

an output end of the rectifier module respectively connected to an anode of the LED light source, a control input end of the selection module and a dimming signal input end of the dimming control module;

the selection module comprising a first pathway and a second pathway which can be gated and output different current values;

an output end of the dimming control module connected to an input end of the first pathway and an input end of the second pathway respectively; and a cathode of the LED light source connected to an output end of the first pathway and an output end of the second pathway.

2. The dimming circuit with a night light function according to claim 1, wherein a resistance range of the first resistor is 0-10Ω.

3. The dimming circuit with a night light function according to claim 1, wherein a resistance range of the second resistor is 10-100Ω.

4. The dimming circuit with a night light function according to claim 1, wherein the selection module further comprises a third resistor, a first capacitor and a second capacitor;

a first power supply end of the switch chip is respectively connected to one end of the third resistor and one end of the first capacitor;

a second power supply end of the switch chip is connected to one end of the third capacitor; and the output end of the dimming control module is connected to the other end of the third resistor, the other end of the first capacitor and the other end of the third capacitor respectively.

5. The dimming circuit with a night light function according to claim 4, wherein a resistance value of the third resistor is 15 KΩ;

a capacitance value of the first capacitor is 4.7 uF; and a capacitance value of the second capacitor is 4.7 uF.

6. The dimming circuit with a night light function according to claim 1, further comprising a ninth resistor;

one end of the ninth resistor being connected to the output end of the rectifier module; and the other end of the ninth resistor being connected to the control input end of the selection module.

7. The dimming circuit with a night light function according to claim 6, wherein a resistance value of the ninth resistor is 51 KΩ.

8. The dimming circuit with a night light function according to claim 1, wherein the rectifier module comprises an insurance resistor, a varistor and a rectifier bridge;

one end of the insurance resistor being used to connect to a live wire of the power supply;

the other end of the insurance resistor being respectively connected to one end of the varistor and a first input end of the rectifier bridge;

the other end of the varistor and a second input end of the rectifier bridge being used to connect to a neutral wire of the power supply; and an output end of the rectifier bridge being respectively connected to an anode of the LED light source, a control input end of the selection module and a dimming signal input end of the dimming control module.

9. The dimming circuit with a night light function according to claim 8, wherein a specification of the insurance resistor is 10 Ω–1 W; and a specification of the varistor is 241 V.

10. The dimming circuit with a night light function according to claim 1, further comprising a dimmer;

an output end of the dimmer being connected to the input end of the rectifier module; and an input end of the dimmer being used to connect to the power supply.

11. The dimming circuit with a night light function according to claim 10, wherein the dimming control module comprises a silicon controlled rectifier constant current control chip;

a dimming signal input end of the silicon controlled rectifier constant current control chip being connected to an output end of the rectifier module; and an output end of the silicon controlled rectifier constant current control chip being connected to a power supply end of the selection module.

12. The dimming circuit with a night light function according to claim 11, wherein the dimming control module further comprises a fourth resistor, a fifth resistor and a sixth resistor;

one end of the fourth resistor being connected to a current discharge end of the silicon controlled rectifier constant current control chip;

the other end of the fourth resistor being respectively connected to one end of the fifth resistor, one end of the sixth resistor and an output current control end of the silicon controlled rectifier constant current control chip;

and the other end of the fifth resistor and the other end of the sixth resistor being grounded.

13. The dimming circuit with a night light function according to claim 12, wherein a resistance range of the fourth resistor is 0-10 Ω;

a resistance range of the fifth resistor is 0-10Ω; and a resistance range of the sixth resistor is 0-10 Ω.

14. The dimming circuit with a night light function according to claim 11, wherein the dimming control module further comprises a seventh resistor;

one end of the seventh resistor being connected to an output end of the silicon controlled rectifier constant current control chip; and the other end of the seventh resistor being connected to a voltage control end of the silicon controlled rectifier constant current control chip.

15. The dimming circuit with a night light function according to claim 14, wherein a resistance value of the seventh resistor is 150 KΩ.

16. The dimming circuit with a night light function according to claim 11, further comprising a tenth resistor;

one end of the tenth resistor being connected to an output end of the rectifier module; and the other end of the tenth resistor being connected to a dimming signal input end of the silicon controlled rectifier constant current control chip.

17. The dimming circuit with a night light function according to claim 1, further comprising a diode;

an anode of the diode being connected to an output end of the rectifier module; and a cathode of the diode being connected to an anode of the LED light source.

18. The dimming circuit with a night light function according to claim 17, further comprising an electrolytic capacitor and an eighth resistor;

an anode of the electrolytic capacitor being connected to one end of the eighth resistor and a cathode of the diode respectively; and a cathode of the electrolytic capacitor being connected to the other end of the eighth resistor and an output end of the dimming control module respectively.

19. A dimming lamp with a night light function, comprising the dimming circuit with a night light function according to claim 1.

* * * * *